(12) United States Patent
Laimböck

(10) Patent No.: US 6,283,085 B1
(45) Date of Patent: Sep. 4, 2001

(54) PISTON ENGINE

(75) Inventor: Franz Laimböck, Thal (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/459,599

(22) Filed: Dec. 13, 1999

(30) Foreign Application Priority Data

Dec. 11, 1998 (AT) .................................................. 825/98 U

(51) Int. Cl.⁷ .................................................. F16C 11/02
(52) U.S. Cl. ..................................... 123/197.4; 123/147.3
(58) Field of Search ............................. 123/197.4, 197.3

(56) References Cited

U.S. PATENT DOCUMENTS

| | | | |
|---|---|---|---|
| 1,936,159 | 11/1933 | Finch . | |
| 5,150,670 | 9/1992 | Sadler . | |
| 5,537,971 | * 7/1996 | Pong | 123/197.4 |
| 5,615,642 | * 4/1997 | Coughlin | 123/197.3 |
| 5,655,496 | * 8/1997 | Pong | 123/197.4 |
| 5,765,451 | * 6/1998 | Carone | 123/197.3 |
| 5,894,763 | * 4/1999 | Peters | 123/197.4 |
| 5,950,579 | * 9/1999 | Ott | 123/197.4 |

FOREIGN PATENT DOCUMENTS 9004725   5/1990  (WO) .

\* cited by examiner

Primary Examiner—Willis R. Wolfe
Assistant Examiner—Jason Benton
(74) Attorney, Agent, or Firm—Dykema Gossett PLLC

(57) ABSTRACT

In a reciprocating engine with at least two cylinders, with at least one primary connecting rod and at least one secondary connecting rod, whose small ends are connected to a piston each, the crankshaft ends of the connecting rods, i.e., the ends opposite of the small ends, are mounted on a common crank pin of a crankshaft. The crankshaft end of the primary connecting rod has a shoulder whose inner surface is rotatably connected to the crank pin via a first bearing, the outer surface of the shoulder defining a bearing surface for at least one secondary connecting rod. The inner and outer surfaces constituting the bearing surfaces of the essentially tubular shoulder extend around the full periphery and are configured as cylindrical surfaces preferably. The at least one secondary connecting rod has a crankshaft end with a non-divided divided big eye surrounding the shoulder of the primary connecting rod, the inner surface of which eye is supported on the outer surface of the shoulder via a second bearing. In this manner a simple and compact link is obtained between connecting rods and crankshaft.

19 Claims, 2 Drawing Sheets

PISTON ENGINE

BACKGROUND OF THE INVENTION

The invention relates to a reciprocating engine, and more particularly an internal combustion engine, with at least two cylinders accommodating a reciprocating piston each, and with at least one primary connecting rod and at least one secondary connecting rod, whose small ends are connected to a piston each, and whose crankshaft ends, i.e., the ends opposite of the small ends of the connecting rods, are mounted on a common crank pin of a crankshaft, the crankshaft end of the primary connecting rod having at least one shoulder whose inner surface is rotatably connected to the crank pin via a first big end bearing, and whose outer surface constitutes a bearing surface for at least one secondary connecting rod.

DESCRIPTION OF THE PRIOR ART

In reciprocating engines, and in particular internal combustion engines where several cylinders are positioned approximately in a plane normal to the crankshaft axis, such as radial engines, a plurality of connecting rods act on a common crank pin. The challenge for the design engineer lies in the minimization of engine length. Several design solutions are known where a plurality of connecting rods are coupled to one and the same crank pin.

In U.S. Pat. No. 5,150,670 A an internal combustion engine is described in which assemblies of three connecting rods are coupled to a common crank pin each. The crankshaft ends of the connecting rods feature shoulders configured as cylinder segments whose inner surfaces engage the crank pin. The outer surfaces of the shoulders are radially secured by rings. This solution requires a certain amount of space and is only suitable for use with reciprocating engines provided with friction bearings between connecting rods and crank pin, where comparatively small inertial forces are encountered. For high-speed internal combustion engines, such as naturally aspirated four-stroke engines, this arrangement of connecting rods is not suitable.

U.S. Pat. No. 5,765,451 A is concerned with a reciproacting engine of the initially described kind, where three connecting rods in fan-type arrangement are coupled to a common crank pin in the same plane. The two outer connecting rods have shoulders configured as cylinder segments, whose inner surfaces engage the crank pin. The outer surfaces of the shoulders are defined as bearing surfaces for the third, i.e., center connecting rod, whose crankshaft end is divided and exhibits slots along its circumference. The shoulders of the two outer connecting rods are disposed within the eye on the crankshaft end of the center connecting rod, the shanks of the outer rods projecting from the eye on the crankshaft end of the central rod through the slots. The center connecting rod thus is supported on the outer surfaces of the shoulders of the outer rods. The length of the circumferential slots is essentially defined by the respective inclination angle between the cylinders. As above, this comparatively complex design can only be used with engines with friction bearings between connecting rods and crank pin.

SUMMARY OF THE INVENTION

It is an object of the invention to provide a simple and compact solution for coupling a plurality of connecting rods to a crank pin in a reciprocating engine of the aforementioned type.

According to the invention this object is achieved by providing that the inner and outer surfaces constituting the bearing surfaces of the essentially tubular shoulder be configured as preferably cylindrical surfaces extending around the full periphery, and that the at least one secondary connecting rod have a crankshaft end with a non-divided, big eye surrounding the shoulder of the primary connecting rod, the inner surface of said eye being supported on the outer surface of the shoulder via a second bearing. This solution is independent of the inclination angles between the cylinders and is thus suited for both fan-type and radial cylinder arrangements.

In a preferred variant, the primary connecting rod has at least two shoulders, which are preferably disposed on either side of a center plane of the connecting rod normal to the crankshaft axis, and more preferably symmetrical to this plane, each shoulder bearing a secondary connecting rod. The two secondary connecting rods on the outer sides are thus supported on the shoulders of the primary connecting rod in the middle. Although the width of the primary connecting rod is somewhat greater than in conventional designs, this arrangement will help reduce overall width. The first big end bearing of the primary connecting rod constituting the master rod, in which the crank pin rotates, may be designed for high load. The secondary connecting rods placed on either side of the master rod will perform only tilting movements in the second big end bearings. On account of their larger diameters they will offer adequate load-bearing capacity despite the small width.

The first and/or second big end bearings may be configured as friction or antifriction bearings, and preferably as needle bearings. The use of needle bearings will reduce friction and improve emergency running properties. In order to avoid bending of the needle ends of the bearing between the primary connecting rod and the crank pin when the crank pin is bent strongly, the needle bearing preferably is configured as a double-row bearing.

Special preference is given to a variant in which the big end of the primary and/or secondary connecting rod has a non-divided eye and the crankshaft is configured as an assembled part. Due to the non-divided configuration of the big ends of the primary and secondary connecting rods reliable bearing properties are obtained, especially with the use of antifriction bearings. For assembly of the connecting rod and the non-split bearing cages of the antifriction bearings the crankshaft must be configured as an assembled part. Preferably, crankshaft and/or connecting rods are made of steel.

The design of the invention is particularly suitable for use with reciprocating engines where three connecting rods are coupled to a common crank pin each.

It may be further provided by the invention that at least two of the connecting rods differ in length. The length of the primary connecting rod may be smaller or greater than the length of the secondary connecting rod. This will permit high flexibility as regards cylinder arrangements.

DESCRIPTION OF THE DRAWINGS

Following is a more detailed description of the invention as illustrated by the accompanying drawings, in which.

Parts fulfilling the same function in either variant bear the same reference numbers.

DESCRIPTION OF PREFERRED VARIANTS

Figure 1:
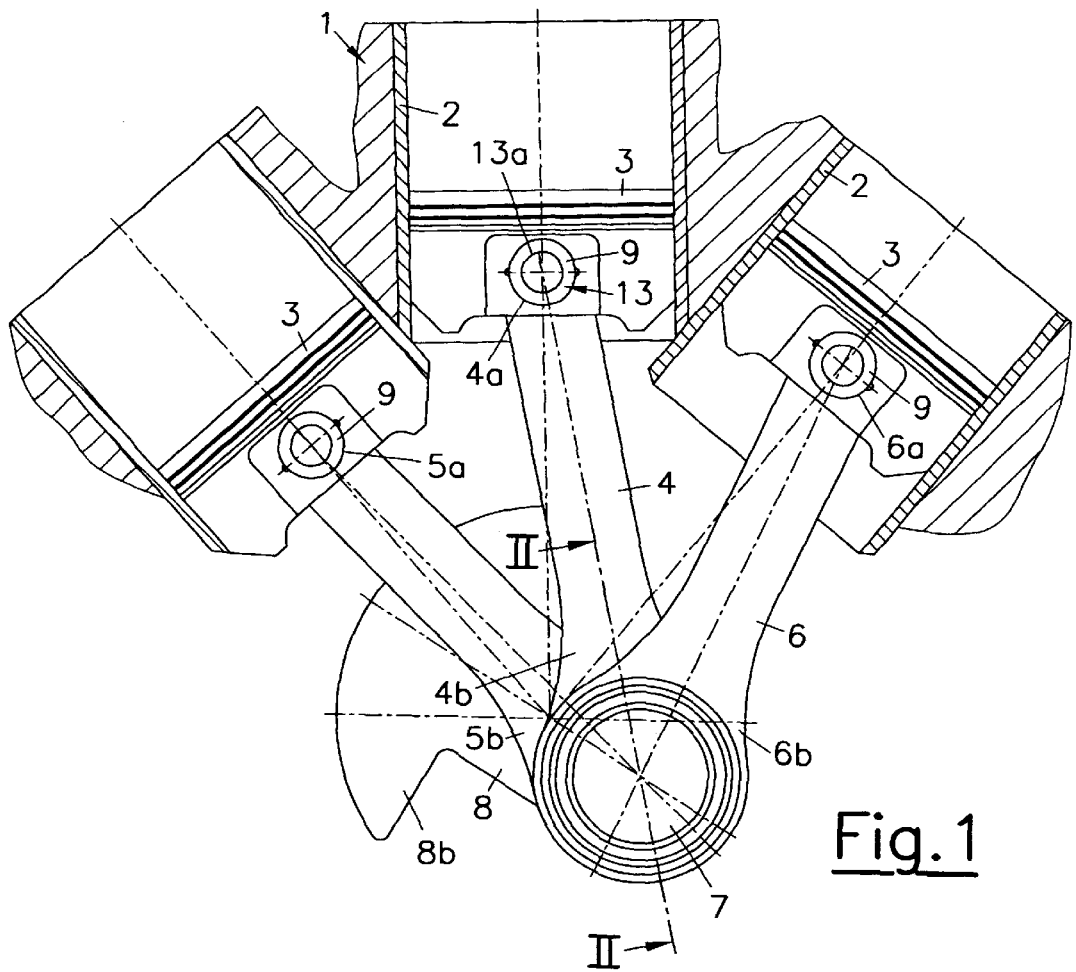
FIG. 1 shows a reciprocating engine in a section transverse to the crankshaft axis, according to a first variant of the invention.
Figure 2:
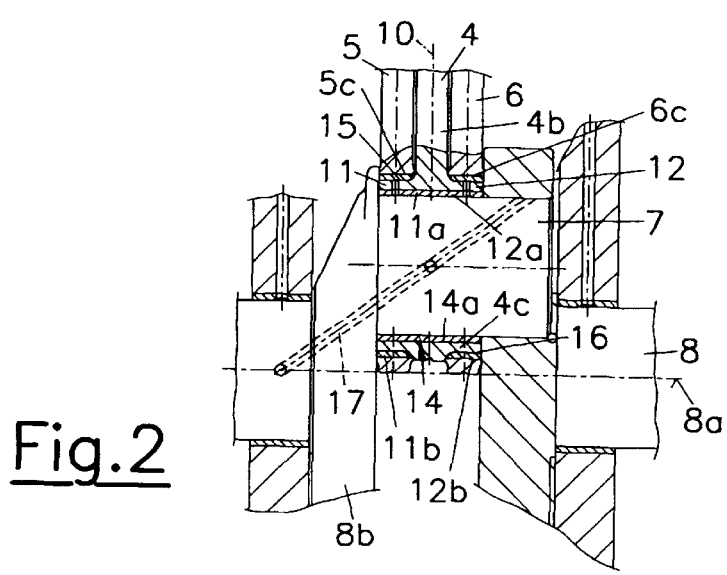
FIG. 2 shows the reciprocating engine in a section along line II—II in FIG. 1.

FIGS. 1 and 2 show a reciprocating engine, such as an internal combustion engine, with fan-type cylinder arrangement, each cylinder 2 containing a piston 3. The pistons 3 are connected to a common crank pin 7 of a crankshaft 8 by means of connecting rods 4, 5, 6. Counterweights 8b rotate together with the crankshaft 8. Via the eyes on their small ends 4a, 5a, 6a, and corresponding small end bearings 13, the connecting rods 4, 5, 6 are pivoted on a piston pin 9 of the piston 3. At the crankshaft ends 4b, 5b, 6b the connecting rods 4, 5, 6 act directly or indirectly on the crank pin 7.

On the crankshaft end 4b the primary connecting rod 4 is provided with shoulders 11, 12 on either side of a connecting rod center plane 10 normal to the crankshaft axis 8a. The inner surfaces 11a, 12a of shoulders 11, 12, which constitute the big eye 4c of the primary connecting rod 4, form the bearing surfaces of the first big end bearing 14, via which the primary connecting rod 4 is mounted on the crank pin 7.

The outer surfaces 11b, 12b of shoulders 11, 12 constitute bearing surfaces of the second big end bearings 15, 16, via which the secondary connecting rods 5, 6 are rotatably connected to the primary connecting rod 4. In the variant shown in FIGS. 1 and 2 the first big end bearing 14 and the second big end bearings 15, 16 are configured as friction bearings 14a, 15a, 16a, which are supplied with lubricating oil from oil holes 17 disposed in the crankshaft 8. The small end bearing 13 also is configured as a friction bearing.

Figure 3:
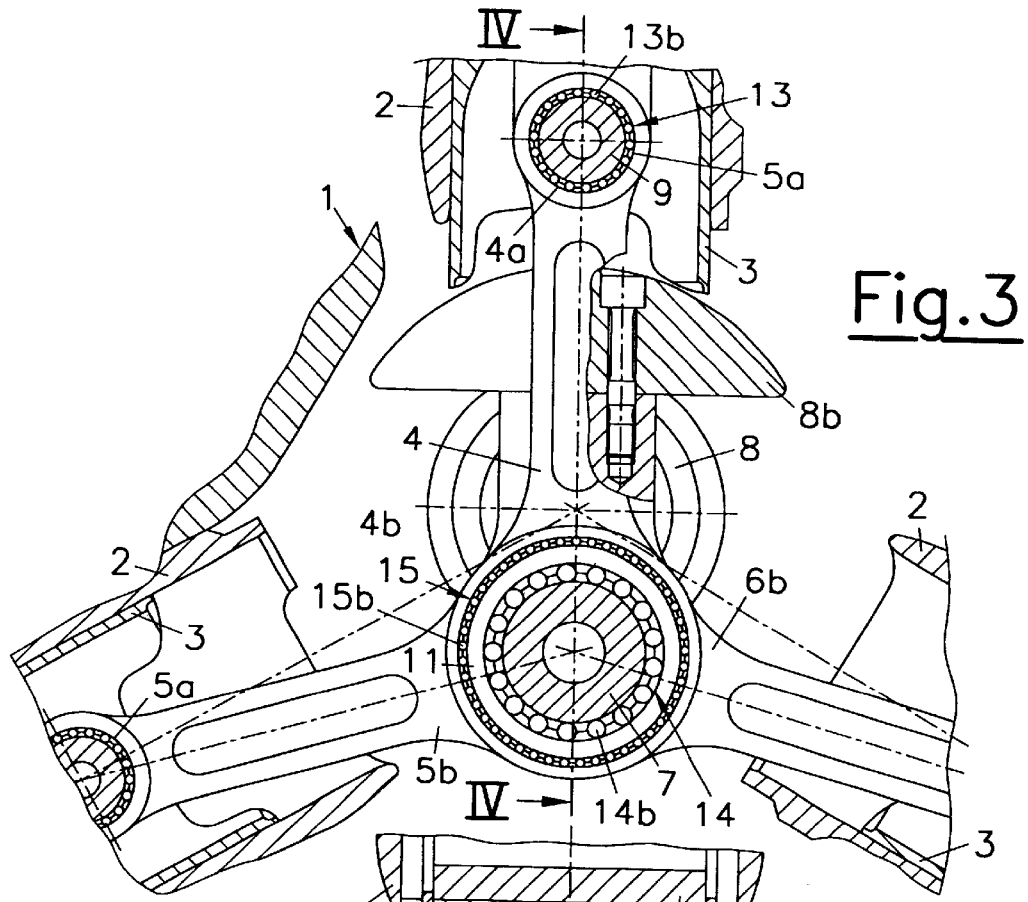
FIG. 3 shows a reciprocating engine in a section transverse to the crankshaft axis, according to a second variant of the invention.
Figure 4:
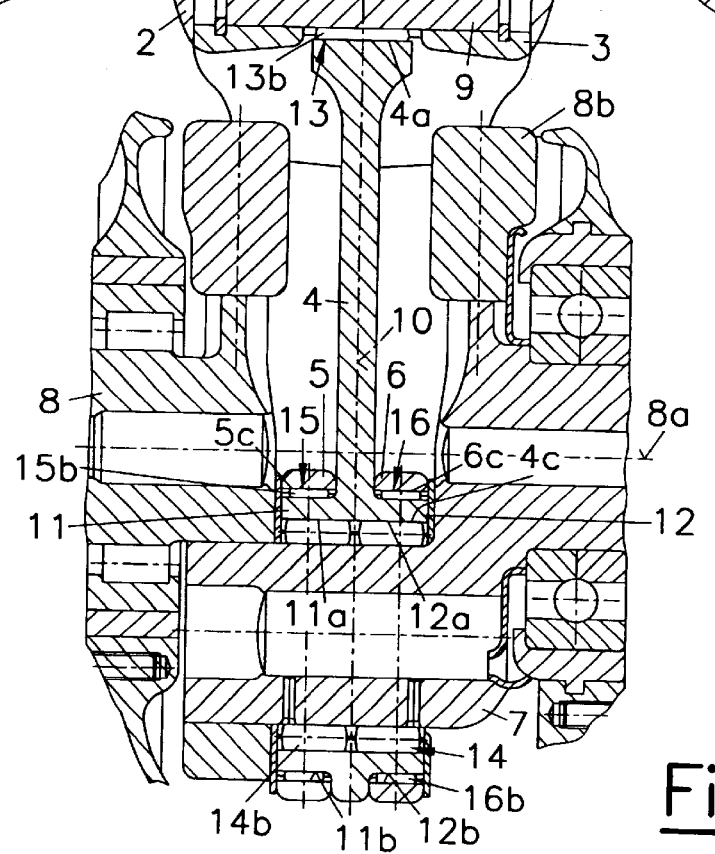
FIG. 4 shows the reciprocating engine in a section along line IV—IV in FIG. 3.

FIGS. 3 and 4 show a reciprocating engine 1 with radially arranged cylinders 2, each accommodating a reciprocating piston 3. Unlike in the variant presented in FIGS. 1 and 2, the first big end bearing 14 supporting the primary connecting rod 4 on the crank pin 7 is configured as a double-row needle bearing 14a. The second big end bearings 15, 16 via which the secondary connecting rods 5, 6 are coupled to the primary connecting rod 4, and the small end bearing 13 are constituted by needle bearings 15b, 16b, 13b. This will reduce friction and improve emergency running properties. To prevent the needle ends of the needle bearing 14b from bending in the instance of strong bending of the crank pin 7, a double-row needle bearing is used. The big eye 4c of primary connecting rod 4 and the big eyes 5c and 6c of secondary connecting rods 5, 6 all are non-divided in order to ensure reliable bearing. For easier assembly of the connecting rods 4, 5, 6 with their non-divided big ends, the crankshaft 8 is designed as an assembled part.

The connecting rods 4, 5, 6 and the crankshaft 8 are preferably made of case hardening steel. Although the shoulders 11, 12 will make for a somewhat larger width of the primary connecting rod 4, the overall width of the crank pin 7 can be kept smaller.

What is claimed is:

1. A reciprocating engine, and more particularly an internal combustion engine, having at least two cylinders, each accommodating a reciprocating piston, and with at least one primary connecting rod and at least one secondary connecting rod, whose small ends are connected to the respective piston, and whose crankshaft ends opposite the small ends of the connecting rods are mounted on a common crank pin of a crankshaft, the crankshaft end of the primary connecting rod having at least one shoulder whose inner surface is rotatably connected to the crank pin via a first big end bearing and whose outer surface constitutes a bearing surface for at least one secondary connecting rod, wherein the inner and outer surfaces constituting the bearing surfaces of the essentially tubular shoulder are configured as essentially cylindrical surfaces extending around the full periphery, and wherein the at least one secondary connecting rod has a crankshaft end with a non-divided, big eye surrounding the shoulder of the primary connecting rod, the inner surface of said eye being supported on the outer surface of the shoulder via a second big end bearing.

2. The reciprocating engine according to claim 1, wherein the primary connecting rod has at least two shoulders, which are disposed on either side of a connecting rod center plane normal to the crankshaft axis, and symmetrical to said plane, each shoulder bearing a secondary connecting rod.

3. The reciprocating engine according to claim 1, wherein the first big end bearing is configured as a friction bearing.

4. The reciprocating engine according to claim 1, wherein the second big end bearing is configured as a friction bearing.

5. The reciprocating engine according to claim 1, wherein the first big end bearing is configured as an antifriction bearing.

6. The reciprocating engine according to claim 5, wherein the first big end bearing is configured as a needle bearing.

7. The reciprocating engine according to claim 6, wherein the second big end bearing is configured as a double-row needle bearing.

8. The reciprocating engine according to claim 1, wherein the second big end bearing is configured as an antifriction bearing.

9. The reciprocating engine according to claim 8, wherein the second big end bearing is configured as a needle bearing.

10. The reciprocating engine according to claim 1, wherein the big end of the primary connecting rod has a non-divided eye and the crankshaft is configured as an assembled part.

11. The reciprocating engine according to claim 1, wherein the big end of the secondary connecting rod has a non-divided eye and the crankshaft is configured as an assembled part.

12. The reciprocating engine according to claim 1, wherein the crankshaft and the connecting rods are made of steel.

13. The reciprocating engine according to claim 1, wherein three connecting rods are each coupled to a common crank pin.

14. The reciprocating engine according to claim 1, wherein the cylinders are arranged in a radial configuration.

15. The reciprocating engine according to claim 1, wherein at least two of the connecting rods differ in length.

16. The reciprocating engine according to claim 15, wherein the primary connecting rod is shorter in length than the secondary connecting rod.

17. The reciprocating engine according to claim 15, wherein the primary connecting rod is longer in length than the secondary connecting rod.

18. A reciprocating engine which comprises:

a crankshaft having a crank pin, a first cylinder containing a reciprocating first piston, a primary connecting rod having a small end connected to said first piston and an opposite crankshaft end that includes a first laterally-extending tubular shoulder extending from a first side thereof, said first tubular shoulder defining an inner cylindrical bearing surface that completely surrounds said crank pin and an outer cylindrical bearing surface, a second cylinder containing a reciprocating second piston, and a first secondary connecting rod having a small end connected to said second piston and an opposite crankshaft end that defines a cylindrical eye that completely surrounds said outer cylindrical bearing surface of the first tubular shoulder of said primary connecting end.

19. A reciprocating engine according to claim 18, wherein said primary connecting rod includes a second laterally-extending shoulder extending from a second side of said crankshaft end, said second tubular shoulder defining an inner cylindrical bearing surface that completely surrounds said crank pin and an outer cylindrical bearing surface, and including a third cylinder containing a reciprocating third piston and a second secondary connecting rod having a small end connected to said third piston and an opposite crankshaft end that defines a cylindrical eye that completely surrounds said outer cylindrical bearing surface of the second tubular shoulder of said primary connecting rod.

* * * * *